United States Patent [19]
Yoon et al.

[11] Patent Number: 5,854,160
[45] Date of Patent: Dec. 29, 1998

[54] LOW TEMPERATURE SINTERING MICROWAVE DIELECTRIC COMPOSITION

[75] Inventors: Ki Hyun Yoon, Kyungki-Do; Woo Sup Kim; Jae Beom Kim, both of Seoul, all of Rep. of Korea

[73] Assignee: LG Electro-Components, Ltd., Rep. of Korea

[21] Appl. No.: 872,411

[22] Filed: Jun. 10, 1997

[30] Foreign Application Priority Data

Jul. 2, 1996 [KR] Rep. of Korea .................. 1996/26754

[51] Int. Cl.$^6$ .................................. C04B 35/465
[52] U.S. Cl. ............................................ 501/136
[58] Field of Search ............................................... 501/136

[56] References Cited

U.S. PATENT DOCUMENTS 5,320,991  6/1994  Takahashi et al. .
5,403,796  4/1995  Takahashi et al. ...................... 501/136
5,444,028  8/1995  Takahashi et al. ...................... 501/136

FOREIGN PATENT DOCUMENTS 0534801  3/1993  European Pat. Off. .

*Primary Examiner*—Deborah Jones
*Attorney, Agent, or Firm*—Ostrolenk, Faber, Gerb & Soffen, LLP

[57] ABSTRACT

A low temperature sintering microwave dielectric composition which can be sintered at a temperature of below 1250° C. The composition includes a composition of $xLiO_{1/2}$—$yCaO$—$zSmO_{3/2}$—$wTiO_2$—$qBO_{3/2}$ where $13.00 \leq x \leq 16.00$, $11.00 \leq y \leq 13.00$, $18.00 \leq z \leq 21.00$, $45.00 \leq w \leq 51.00$ and $0 < q \leq 12.0$ wherein the numeric values are based on mol % with respect to the entire composition.

2 Claims, No Drawings

LOW TEMPERATURE SINTERING MICROWAVE DIELECTRIC COMPOSITION

BACKGROUND OF THE INVENTION

1. Field of the Invention

The present invention relates to a low temperature sintering microwave dielectric composition, and in particular to an improved low temperature sintering microwave dielectric composition which can be sintered at a temperature of below 1250° C.

2. Description of the Conventional Art

Recently, as wireless communications such as mobile communication, satellite communication, etc. increase, the need for communication equipment is increased. Additionally, as the use of digital communication is increased, the usage of microwave equipment is increased.

As components for the above-described communication equipments, there are a duplexor, a band-pass filter, a voltage control oscillator, a flat-type antenna for a Global Positioning System (GPS), an interstage LC-chip, etc. Theses components are mainly made of a low loss dielectric composition as a main material, so called a microwave dielectric composition.

Microwave dielectric compositions containing $TiO_2$ were first introduced in the 1960s. Since then, various types of microwave dielectric compositions have been introduced in the industry.

For example, for a high power wireless communication component, there is known $BaO$—$PbO$—$Nd_2O_3$(or $Sm_2O_3$)—$TiO_2$ type composition and for a low power digital communication component, there are known $Mg(Ca)TiO_3$ and $(ZrSn)TiO_4$ type compositions and for satellite communication components, there are known $Ba(MgTa)O_3$ type compositions.

Such microwave dielectric compositions are required to have the following dielectric characteristics for being used for various high power wireless communication components.

First, in order to enhance a high frequency selection characteristic, a high quality (Q) factor (above 3000 at 1 GHz) is necessary. In addition, a high dielectric constant ratio of above $\in_r > 20$ is needed for a compact-sized component. Third, in order to secure a temperature stable circuit, it should be possible to adjust the temperature coefficient of resonant frequency to 0 by adjusting the component ratio of the composition.

In addition, for being used in an LC-chip filter, the sintering temperature of the dielectric composition should be below 1250° C. which temperature is the upper limit temperature of sintering a nickel electrode and a high temperature electrode material such as Ag and Pd.

In addition, since the high temperature sintering may cause an increase of the fabrication cost of the components, the low temperature sintering is preferred. For the low temperature sintering, a glass frit may be added. Since the glass frit decreases the sintering temperature, but degrades the dielectric characteristic, it is preferred to add less amount of the glass frit at the time of sintering the dielectric composition.

SUMMARY OF THE INVENTION

Accordingly, it is an object of the present invention to provide a low temperature sintering microwave dielectric composition.

It is another object of the present invention to provide an improved low temperature sintering microwave dielectric composition which can be sintered at a temperature of below 1250° C.

To achieve the above objects, there is provided a low temperature sintering microwave dielectric composition which includes a composition of $xLiO_{1/2}$—$yCaO$—$zSmO_{3/2}$—$wTiO_2$—$qBO_{3/2}$ where $13.00 \leq x \leq 16.00$, $11.00 \leq y \leq 13.00$, $18.00 \leq z \leq 21.00$, $45.00 \leq w \leq 51.00$ and $0 < q \leq 12.0$ wherein the numeric value are based on mol % with respect to the entire composition.

Additional advantages, objects and features of the invention will become more apparent from the description which follows.

DETAILED DESCRIPTION OF THE INVENTION

The low temperature sintering high frequency composition according to the present invention will now be explained.

The low temperature sintering high frequency dielectric composition according to the present invention comprises a composition of $xLiO_{1/2}$—$yCaO$—$zSmO_{3/2}$—$wTiO_2$—$qBO_{3/2}$ where $13.00 \leq x \leq 16.00$, $11.00 \leq y \leq 13.00$, $18.00 \leq z \leq 21.00$, $45.00 \leq w \leq 51.00$ and $0 < q \leq 12.0$ wherein the numeric value are based on mol % with respect to the entire composition.

If the composition according to the present invention is sintered at below 1250° C., the composition has a high specific dielectric constant K of over 100 at 1 GHz, a high quality factor ($Q \approx \tan^{-1}\delta$) of over 5100, and a resonant frequency temperature coefficient (TCF) near 0 PPM/° C., so that the composition according to the present invention may be used for a high power output wireless communication component used is a Personal Handphone System (PHS) band-pass filter, a Cordless Telephone—2 band-pass filter, a CT—1+ band-pass filter, an analog Cellular/Phone (C/P) duplexor, a digital C/P duplexor, etc. as well as an electrode sintering product.

The low temperature sintering high frequency composition according to the present invention will now be explained in more detail with reference the following examples.

EXAMPLE I

In order to prepare a dielectric composition of $LiO_{1/2}$ of 15.1 mol %, CaO of 12.51 mol %, $SmO_{3/2}$ of 20.01 mol %, $TiO_2$ of 50.03 mol %, and $BO_{3/2}$ of 2.44 mol %, powders of $CaCO_3$, $Li_2CO_3$, $Sm_2O_3$, $TiO_2$, and $B_2O_3$ were weighed and mixed. The mixture was mixed with $ZrO_2$ and alcohol, and then the resultant mixture was ground and mixed for 24 hours.

The resultant mixture was dehydrated for 24 hours, and the dehydrated powder mixture was calcinated in an $Al_2O_3$ furnace at a temperature of 900° to 1050° C. for 2–4 hours, then the calcinated powder was mixed with $ZrO_2$ and alcohol, the resultant mixture was ground and then dehydrated for 24 hours, and the dehydrated powder was refined by using a #200 mesh filter.

Thereafter, 10 g of the powder and 0.2 cc of an aqueous solution containing 5% PVA (polyvinyl alcohol) were well mixed, the mixture was dehydrated for 10 minutes, and was cold-molded at a pressure of 40 Kgf/cm². The cold-molded resultant structure was sintered at a temperature of 1200°–1250° C. for 3–6 hours.

In order to measure the dielectric characteristic, a sample having a diameter of 9.8–10 mm was polished to have a diameter-to-height ratio of 1:0.45, and then the sample was polished again in order to minimize the degradation of the quality factor with respect to the surface coarseness of the sample, for thus fabricating a mirror-surfaced sample.

The dielectric characteristic of the sample was measured by a parallel plate method by using a Transverse Electric Field (TE) at a microwave band-pass filter (300 MHz–30 GHz). The temperature coefficient of the resonant frequency was measured at a temperature of 20°–80° C.

The results of the measurements are shown in Table I.

EXAMPLES II–IX

In the same manner as Example I, samples was prepared of the composition listed in Table I. In addition, the dielectric characteristics were measured by the same method as in Example I, and the results thereof are listed in Table I.

TABLE I

| | x | y | z | w | q | K | Q | TCF |
|---|---|---|---|---|---|---|---|---|
| Ex. 1 | 15.01 | 12.51 | 20.01 | 50.03 | 2.44 | 106 | 5680 | 0 |
| Ex. 2 | 14.82 | 12.35 | 19.77 | 49.42 | 3.64 | 105.6 | 5620 | −1.5 |
| Ex. 3 | 14.65 | 12.20 | 19.53 | 48.81 | 4.81 | 105.3 | 5600 | −2.7 |
| Ex. 4 | 14.47 | 12.05 | 19.29 | 48.22 | 5.97 | 105 | 5570 | −4.6 |
| Ex. 5 | 14.29 | 11.91 | 19.06 | 47.63 | 7.11 | 104.8 | 5540 | −5.8 |
| Ex. 6 | 14.12 | 11.76 | 18.83 | 47.05 | 8.24 | 104 | 5500 | −7.1 |
| Ex. 7 | 13.95 | 11.62 | 18.59 | 46.48 | 9.36 | 102.6 | 5400 | −8.2 |
| Ex. 8 | 13.78 | 11.48 | 18.37 | 45.92 | 10.45 | 100.8 | 5240 | −9.8 |
| Ex. 9 | 13.61 | 11.34 | 18.15 | 45.37 | 11.53 | 99.67 | 5187 | −11.3 |

(In Table I, Exs. 1 through 9 denotes Examples 1 through 9)

Since the low temperature sintering microwave dielectric composition according to the present invention has a high quality factor and a high dielectric constant in a microwave range, and the temperature coefficient of resonant frequency is made stable, the composition prepared according to the present invention is well applicable to various high power output wireless communication components, so that it is possible to enhance a frequency selection characteristic and to fabricate a compact-sized system with temperature stability.

In addition, since the sintering temperature is lower than the conventional composition, it is possible to reduce the fabrication cost of various high power output wireless communication components. Furthermore, since the composition according to the present invention is sintered at a temperature of below 1250° C., the composition is well usable as a material for a high performance LC-chip filter.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A low temperature sintering high frequency dielectric composition, comprising a composition of $xLiO_{1/2}$—$yCaO$—$zSmO_{3/2}$—$wTiO_2$—$qBO_{3/2}$ where $13.00 \leq x \leq 16.00$, $11.00 \leq y \leq 13.00$, $18.00 < z \leq 21.00$, $45.00 \leq w 51.00$ and $0 \leq q \leq 12.0$ wherein the numeric values are based on mol % with respect to the entire composition.

2. The composition of claim 1, wherein said composition is sintered at a temperature below 1250° C.

\* \* \* \* \*